(12) United States Patent
Minamiyama et al.

(10) Patent No.: US 10,271,697 B2
(45) Date of Patent: Apr. 30, 2019

(54) ELECTRIC OPENING AND CLOSING DEVICE

(71) Applicant: AISIN SEIKI KABUSHIKI KAISHA, Kariya-shi (JP)

(72) Inventors: Hirotomo Minamiyama, Nagoya (JP); Sayaka Hara, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/844,789

(22) Filed: Dec. 18, 2017

(65) Prior Publication Data
US 2018/0199772 A1    Jul. 19, 2018

(30) Foreign Application Priority Data

Jan. 19, 2017    (JP) .................................. 2017-007173

(51) Int. Cl.
| | |
|---|---|
| *F16H 35/10* | (2006.01) |
| *A47K 13/10* | (2006.01) |
| *H02K 7/116* | (2006.01) |
| *F16D 7/10* | (2006.01) |
| *F16D 7/04* | (2006.01) |

(52) U.S. Cl.
CPC ............ *A47K 13/105* (2013.01); *F16D 7/048* (2013.01); *F16D 7/10* (2013.01); *H02K 7/116* (2013.01); *F16H 35/10* (2013.01)

(58) Field of Classification Search
CPC .................................................. A47K 13/105
USPC ....................... 4/246.1–246.5, 248
See application file for complete search history.

(56) References Cited

U.S. PATENT DOCUMENTS

| | | | | | |
|---|---|---|---|---|---|
| 1,948,182 | A | * | 2/1934 | Moore | ................... A47K 13/10 4/243.1 |
| 4,984,666 | A | * | 1/1991 | Orii | ....................... A47K 13/10 192/12 B |
| 6,067,667 | A | * | 5/2000 | Suzuki | ................... A47K 13/10 4/246.1 |
| 7,293,297 | B2 | * | 11/2007 | Hayashi | ................. A47K 13/10 4/246.1 |

(Continued)

FOREIGN PATENT DOCUMENTS

| | | |
|---|---|---|
| JP | 2010-142340 | 7/2010 |
| JP | 2014-246880 | 11/2010 |
| JP | 2014-149013 | 8/2014 |

*Primary Examiner* — Lori Baker
(74) *Attorney, Agent, or Firm* — Oblon, McClelland, Maier & Neustadt, L.L.P.

(57) ABSTRACT

An electric opening and closing device that opens and closes a toilet seat or lid by a torque output to an output member includes: a motor; a reduction gear mechanism having gear members including a gear member of a spur tooth and transmitting the torque of the motor to the output member; and a torque limiter that includes a first rotating member rotating integrally with a first gear member rotating by the torque among the gear members, a second rotating member rotating integrally with a second gear member connected to the output member via the gear member of the spur tooth or the output member, and a friction member engaged with one of the first and second rotating members, and that generates a slip between the friction and other rotating members to interrupt the transmission of the torque when a torque exceeding a value acts on the output member.

5 Claims, 4 Drawing Sheets

(56) References Cited

U.S. PATENT DOCUMENTS

| | | | |
|---|---|---|---|
| 2005/0006832 A1* | 1/2005 | Hoshi | A47K 13/12 267/154 |
| 2005/0064980 A1* | 3/2005 | Hoshi | F16D 7/021 475/257 |
| 2005/0217010 A1* | 10/2005 | Hayashi | A47K 13/10 4/246.1 |
| 2017/0335895 A1* | 11/2017 | Kobayashi | F16D 7/022 |

* cited by examiner

ELECTRIC OPENING AND CLOSING DEVICE

CROSS REFERENCE TO RELATED APPLICATIONS

This application is based on and claims priority under 35 U.S.C. § 119 to Japanese Patent Application 2017-007173, filed on Jan. 19, 2017, the entire contents of which are incorporated herein by reference.

TECHNICAL FIELD

This disclosure relates to an electric opening and closing device that opens and closes a toilet seat or a toilet lid by a torque output to an output member.

BACKGROUND DISCUSSION

In the related art, as this type of electric opening and closing device, there is proposed a device provided with a torque limiter having an outer ring integrally rotating with a worm, a sleeve integrally rotating with a motor shaft, and an inner ring provided on an outer circumference of the sleeve so as to be relatively non-rotatable, and a coil spring that is engaged with the outer ring, fastened to the inner ring, and generates relative rotation between the outer ring and the inner ring in a case where an external force equal to or greater than a predetermined load is applied thereto (for example, refer to JP 2010-246880A (Reference 1)). The electric opening and closing device decelerates rotation of the worm and opens and closes a driven member (toilet seat and toilet lid) by a reduction gear mechanism having a worm wheel meshed with the worm.

In the above-described electric opening and closing device, since the outer ring, the sleeve, and the inner ring are required in addition to the coil spring, the device is complicated. In addition, in the above-described electric opening and closing device, although the torque limiter is provided between the motor shaft and the worm, but since the worm has a large variation in the torque transmission efficiency, it is difficult to control a slip torque.

Thus, a need exists for an electric opening and closing device which is not susceptible to the drawback mentioned above.

SUMMARY

A gist of an electric opening and closing device according to an aspect of this disclosure resides in that the electric opening and closing device opens and closes a toilet seat or a toilet lid by a torque output to an output member, and the device includes a motor, a reduction gear mechanism that has a plurality of gear members including at least a gear member of a spur tooth and transmits the torque of the motor to the output member, and a torque limiter that includes a first rotating member which rotates integrally with a first gear member rotating by the torque of the motor among the plurality of gear members, a second rotating member which rotates integrally with a second gear member connected to the output member via the gear member of the spur tooth among the plurality of gear members or the output member, and a friction member which is engaged with one rotating member of the first rotating member and the second rotating member, and is in frictional contact with the other rotating member, and that generates a slip between the friction member and the other rotating member to interrupt the transmission of the torque when a torque exceeding a specified value acts on the output member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment for performing this disclosure will be described with reference to examples.

Embodiment

Figure 1:
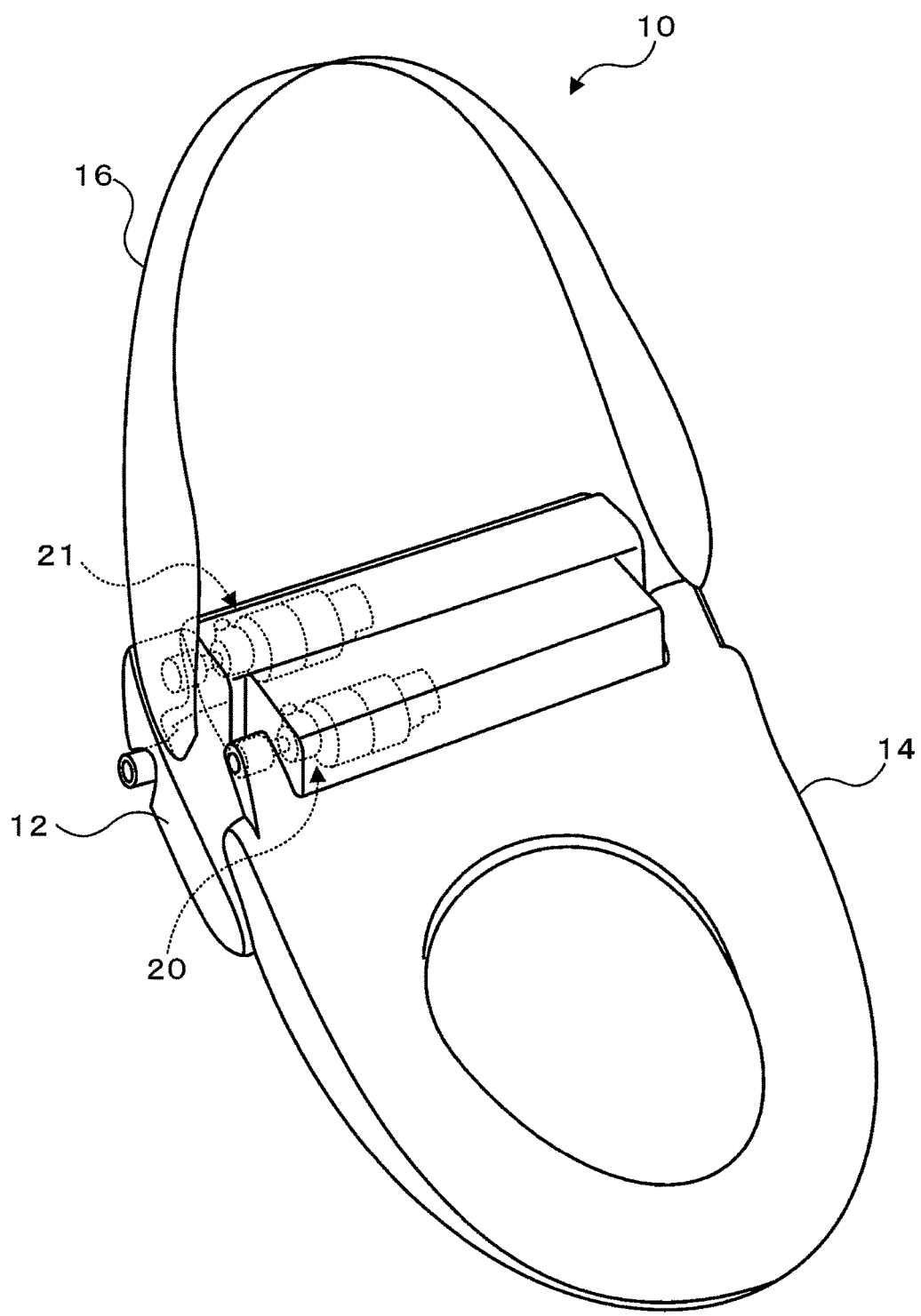
FIG. 1 is a schematic diagram illustrating a configuration of a toilet seat device having an electric opening and closing device according to one embodiment disclosed here.
Figure 2:
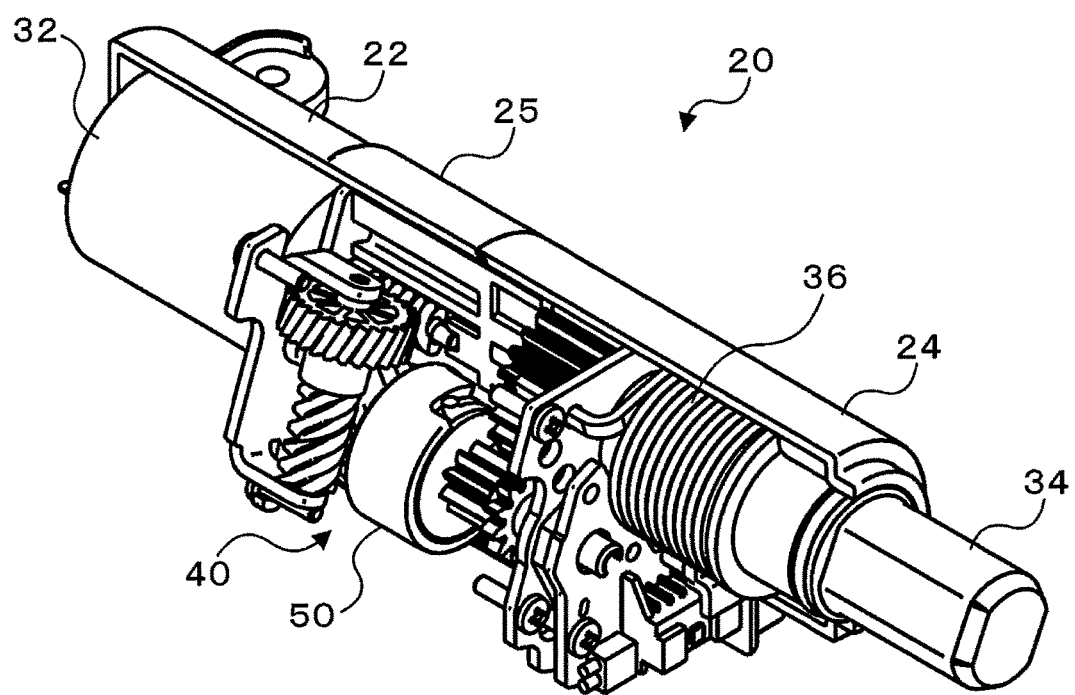
FIG. 2 is a schematic diagram illustrating a configuration of the electric opening and closing device.
Figure 3:
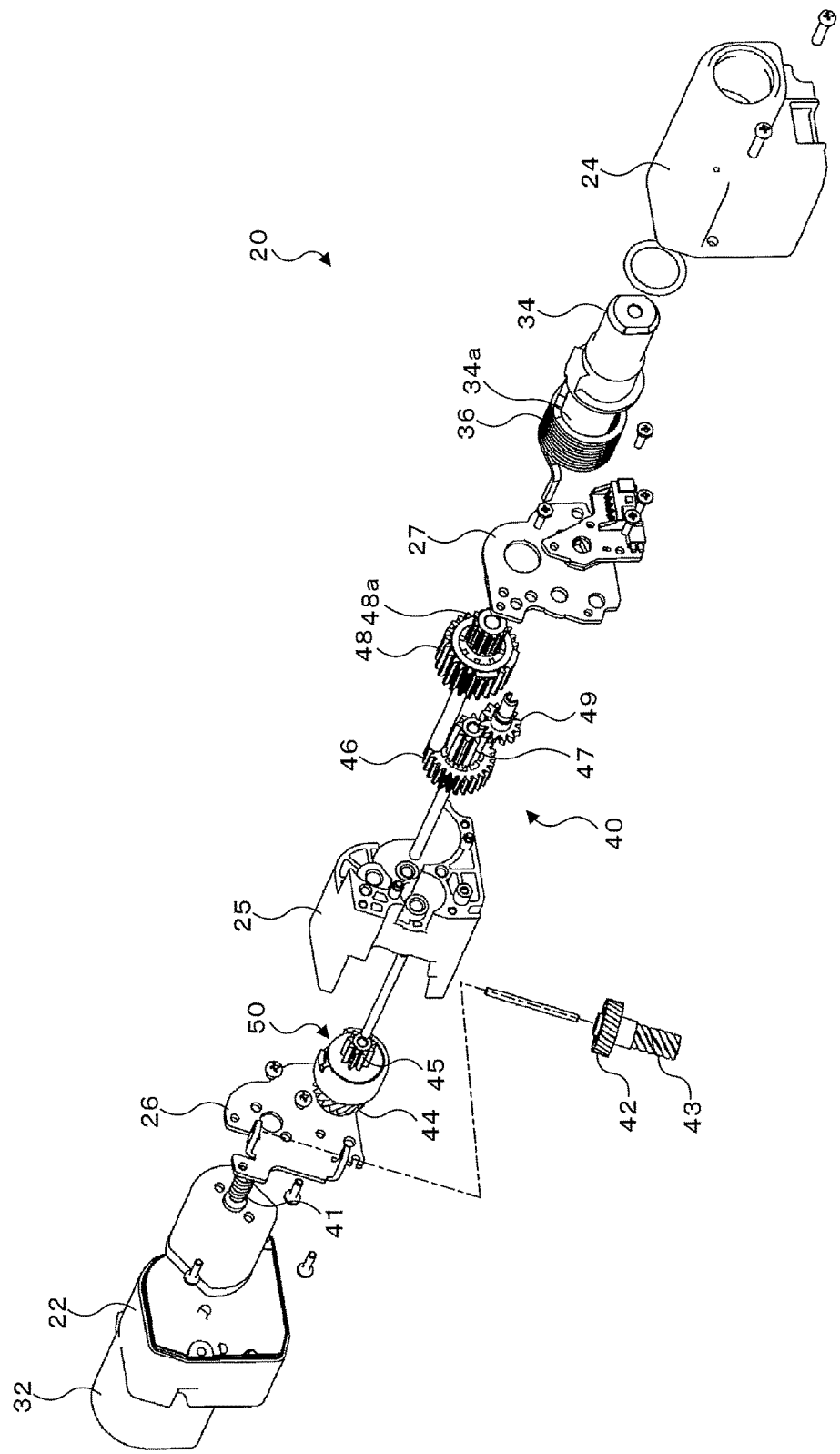
FIG. 3 is an exploded perspective view illustrating the electric opening and closing device in an exploded manner.

FIG. 1 is a schematic diagram illustrating a configuration of a toilet seat device 10 having an electric opening and closing device 20 according to one embodiment disclosed here. FIG. 2 is a schematic diagram illustrating a configuration of the electric opening and closing device 20. FIG. 3 is an exploded perspective view illustrating the electric opening and closing device 20 in an exploded manner. The toilet seat device 10 is installed on an upper surface of a toilet bowl and is configured as a warm water washing toilet seat device that can clean a private part of a user sitting on a toilet seat 14 with washing water sprayed from a nozzle (not illustrated). As illustrated in FIG. 1, the toilet seat device 10 is provided with a main body 12 installed behind the upper surface of the toilet bowl, the toilet seat 14 and a toilet lid 16 supported to be openable and closable with respect to the main body 12, and electric opening and closing devices 20 and 21 built in the main body 12 for opening and closing the toilet seat 14 and the toilet lid 16, respectively. Hereinafter, the details of the electric opening and closing device 20 will be described. The electric opening and closing device 21 is configured similarly to the electric opening and closing device 20, so that the detailed description will be omitted.

As illustrated in FIGS. 2 and 3, the electric opening and closing device 20 is provided with a motor 32, an output shaft 34, a reduction gear mechanism 40, a torque limiter 50, a first housing 22 that houses the motor 32, a second housing 24 that houses a portion of the output shaft 34 and a portion of the reduction gear mechanism 40, and a bracket 25 that is provided between the first and second housings 22 and 24.

The output shaft 34 is fitted to the rotating portion of the toilet seat 14 so as to be relatively non-rotatable, and opens and closes the toilet seat 14 with rotation. In addition, as illustrated in FIGS. 2 and 3, the output shaft 34 is provided with an assist spring 36 for urging the toilet seat 14 in an opening direction.

As illustrated in FIG. 3, the reduction gear mechanism 40 is provided with a first worm 41 coaxially connected so as to rotate integrally with a rotary shaft (not illustrated) of the motor 32, a first worm wheel 42 meshed with the first worm 41, a second worm 43 coaxially connected so as to rotate integrally with the first worm wheel 42, a second worm wheel 44 meshed with the second worm 43, a first small diameter gear 45 of a spur tooth coaxially connected so as to rotate integrally with the second worm wheel 44, a first large diameter gear 46 of a spur tooth meshed with the first small diameter gear 45, a second small diameter gear 47 coaxially connected so as to rotate integrally with the first large diameter gear 46, and a output gear 48 of a spur tooth and a large diameter meshed with the second small diameter gear 47. In the output gear 48, a cylindrical connecting portion 48a having a spline on the outer circumferential surface extends in the axial direction, and an outer circumferential surface of the connecting portion 48a is spline-fitted to an inner circumferential surface of a cylindrical connecting portion 34a provided at the end portion of the output shaft 34. As a result, the torque from the motor 32 is transmitted to the output shaft 34 through deceleration by the first worm 41 and the first worm wheel 42 meshing with each other, deceleration by the second worm 43 and the second worm wheel 44 meshing with each other, deceleration by the first small diameter gear 45 and the first large diameter gear 46 meshing with each other, and deceleration by the second small diameter gear 47 and the output gear 48 meshing with each other, so that the toilet seat 14 is opened and closed. A rotational angle measurement gear 49 meshes with the output gear 48, and a rotational angle sensor (for example, rotary potentiometers, rotary encoders, and the like) that is not illustrated and outputs a signal corresponding to the rotation angle is provided to the rotational angle measurement gear 49.

The first worm wheel 42 and the second worm 43 are integrally formed with a resin material, and are rotatably supported by a support plate 26. The second worm wheel 44 and the first small diameter gear 45 are respectively molded with a resin material, connected via the torque limiter 50, and are rotatably supported by the bracket 25 and the support plate 26. The first large diameter gear 46 and the second small diameter gear 47 are integrally formed with a resin material, and are rotatably supported by the bracket 25 and a second support plate 27. The output gear 48 is formed with a resin material, and is rotatably supported by the bracket 25 and the second support plate 27.

Figure 4:
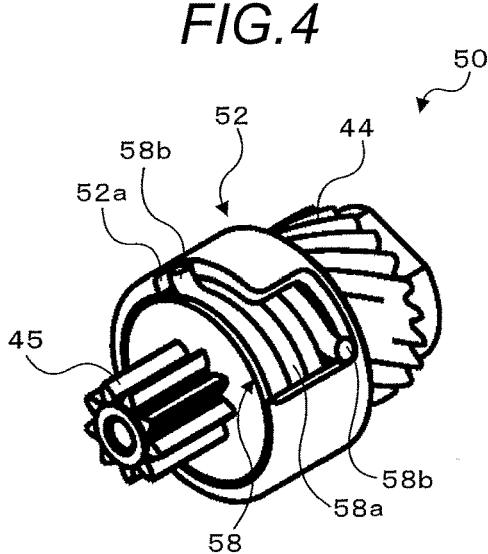
FIG. 4 is an external perspective view illustrating the external appearance of a torque limiter.
Figure 5:
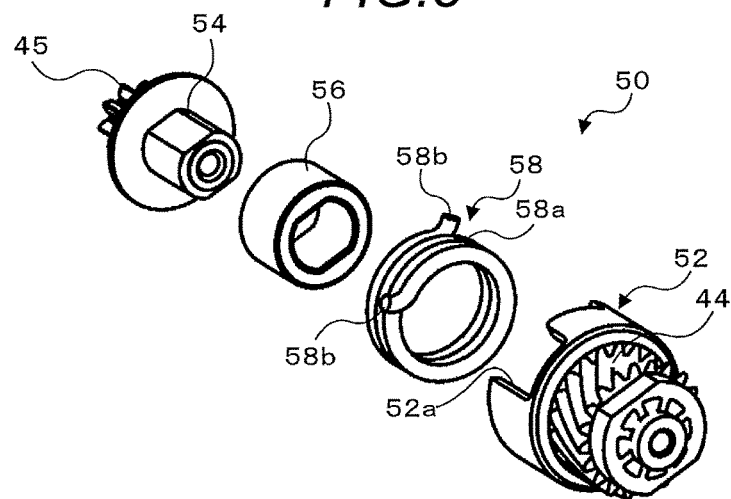
FIG. 5 is an exploded perspective view illustrating the torque limiter in an exploded manner.
Figure 6:
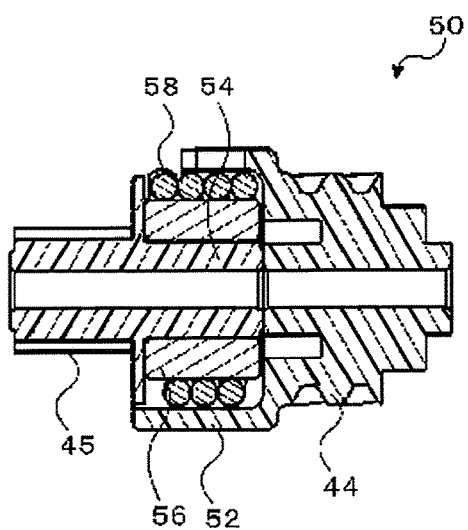
FIG. 6 is a cross-sectional view of the torque limiter.

The torque limiter 50 blocks an excessive torque input to the output shaft 34. FIG. 4 is an external perspective view illustrating the external appearance of a torque limiter 50. FIG. 5 is an exploded perspective view illustrating the torque limiter 50 in an exploded manner. FIG. 6 is a cross-sectional view of the torque limiter 50. The torque limiter 50 is provided with an outer ring 52 coaxially connected to the second worm wheel 44 to integrally rotate therewith, a flanged rotary shaft 54 coaxially connected to the first small diameter gear 45 to integrally rotate therewith, an inner ring 56 as a cylindrical member inserted through the outer circumference of the rotary shaft 54 so as to butt against a flange, and a coil spring 58 mounted between the outer ring 52 and the inner ring 56.

The outer ring 52 is integrally molded with the second worm wheel 44 with a resin material, and an opening window 52a which is opened at a predetermined angle in the circumferential direction is formed in a side wall portion. The rotary shaft 54 is integrally molded with the first small diameter gear 45 with a resin material, and is formed in an I-shaped cross section. The inner ring 56 is a cylindrical member made of metal, and is increased to a sufficient hardness by heat treatment or the like. The inner ring 56 has an I-shaped cross-sectional shaft hole inside and is connected to the rotary shaft 54 formed in the same I-shaped cross section so as to be relatively non-rotatable.

The coil spring 58 is a metal coil spring, has a spiral portion 58a, and two linear portions 58b extending in the radial direction from both end portions of the spiral portion 58a. The inner circumferential portion of the spiral portion 58a is press-fitted to the outer circumferential surface of the inner ring 56 and is in frictional contact therewith. The two linear portions 58b are respectively engaged with both end portions in the circumferential direction of the opening window 52a of the outer ring 52. As a result, relative movement of the coil spring 58 in the circumferential direction with respect to the outer ring 52 is restricted. In the embodiment, an opening angle in the circumferential direction of the two linear portions 58b is smaller than an opening angle in the circumferential direction of the opening window 52a, and the coil spring 58 has play in the circumferential direction with respect to the outer ring 52. Therefore, an abutting position between the two linear portions 58b of the coil spring 58 and the both end portions of the opening window 52a of the outer ring 52 changes depending on the rotation direction of the gear, when the gear rotates in one direction, one of the two linear portions 58b of the coil spring 58 abuts against one of the both end portions of the opening window 52a to integrally rotate the outer ring 52 and the inner ring 56, and when the gear rotates in the other direction, the other of the two linear portions 58b of the coil spring 58 abuts against the other of the both end portions of the opening window 52a to integrally rotate the outer ring 52 and the inner ring 56.

In addition, the coil spring 58 is formed so that the length in the axial direction is shorter than that of the inner ring 56. Therefore, even if a load acts on the first small diameter gear 45 in the axial direction due to an external force, the coil spring 58 is not compressed in the axial direction and is not affected by the load.

In the electric opening and closing device 20 configured in this manner, a worm and a worm wheel (first worm 41, first worm wheel 42, second worm 43, and second worm wheel 44) are disposed between the motor 32 and the torque limiter 50, and a gear of a spur tooth (first small diameter gear 45, first large diameter gear 46, second small diameter gear 47, and output gear 48) is disposed between the torque limiter 50 and the output shaft 34. When an external force (torque) is input to the output shaft 34 (toilet seat 14), the input external force is transmitted to the torque limiter 50 via the gear of the spur tooth. When a torque exceeding the regulation (slip torque) is transmitted to the torque limiter 50, a slip is generated between the coil spring 58 and the inner ring 56, and the torque is blocked. As a result, it is possible to prevent an excessive load from acting on the gear provided in the reduction gear mechanism 40 and to prevent the gear from being damaged. In the embodiment, since only the gear of the spur tooth and small variation in torque transmission efficiency (individual difference) is disposed between the torque limiter 50 and the output shaft 34, it is possible to easily manage the slip torque as compared with a case where a worm having a large variation in the torque transmission efficiency (individual difference) is disposed between the torque limiter and the output shaft.

In the electric opening and closing device 20 of the embodiment described above, the torque limiter 50 disposed in the reduction gear mechanism 40 is configured to include the outer ring 52 integrally rotating with the second worm wheel 44 of the reduction gear mechanism 40, the inner ring 56 integrally rotating with the first small diameter gear 45 of a spur tooth connected to the output shaft 34 through the first large diameter gear 46 of a spur tooth, the second small diameter gear 47 of a spur tooth, and the output gear 48 of a spur tooth, and the coil spring 58 mounted between the outer ring 52 and the inner ring 56. Since the variation in the torque transmission efficiency of the gear of the spur tooth is smaller than that of the gear such as the worm, by interposing only the gear of the spur tooth between the torque limiter 50 and the output shaft 34, it is easy to manage the torque (slip torque) that causes slip between the coil spring 58 and the inner ring 56 by the external force from the output shaft 34. In addition, since the torque limiter 50 is configured to include the outer ring 52, the inner ring 56, and the coil spring 58, the configuration can be simplified.

In addition, in the electric opening and closing device 20 of the embodiment, the inner ring 56 is configured to include a metal cylindrical member, since the spiral portion 58a of the metal coil spring 58 is brought into frictional contact with the outer circumference of the inner ring 56, abrasion between the inner ring 56 and the coil spring 58 is reduced, and it is possible to suppress a decrease in frictional force due to aging, that is, a decrease in the slip torque.

Furthermore, in the electric opening and closing device 20 of the embodiment, since the first worm 41, the first worm wheel 42, the second worm 43 and the second worm wheel 44 are disposed between the motor 32 and the torque limiter 50, the rotation of the motor 32 is sufficiently reduced and transmitted to the output shaft 34 while the worm is not disposed between the torque limiter 50 and the output shaft 34 so that the slip torque can be easily managed.

In addition, in the electric opening and closing device 20 of the embodiment, since the outer ring 52 of the torque limiter 50 is integrally formed with the second worm wheel 44 and the rotary shaft 54 is formed integrally with the first small diameter gear 45, the number of parts can be reduced and the configuration can be further simplified.

In the embodiment, although the inner ring 56 has the shaft hole of the I-shaped cross section inside and is fixed so as to be relatively non-rotatable to the rotary shaft 54 similarly formed in the I-shaped cross section, embodiments disclosed herein are not limited thereto, and for example, any cross section shape may be adopted as long as the inner ring 56 and the rotary shaft 54 can be fixed to each other, such as fixing with a D-shaped cross section. In addition, the inner ring 56 may be fixed by press fitting the inner ring into the rotary shaft.

In the embodiment, although the inner ring 56 is formed to include metal similar to the coil spring 58, the inner ring 56 may be formed to include a resin material. In this case, the inner ring 56 and the rotary shaft 54 may be integrated with the resin material. In this case, the first small diameter gear 45, the rotary shaft 54, and the inner ring 56 can be integrated with the resin material, and the number of parts can be reduced and the configuration can be further simplified.

In the embodiment, although the coil spring 58 is used as a friction member that is brought into frictional contact with the inner ring 56, embodiments disclosed herein are not limited thereto, and it may be configured with any member if the member is engaged with one of the inner ring and the outer ring and is pressed against the other of the inner ring and the outer ring so as to be in frictional contact therewith.

In the embodiment, although the outer ring 52 is integrally molded with the second worm wheel 44, embodiments disclosed herein are not limited thereto, and it may be configured with a separate member if the outer ring 52 and the second worm wheel 44 are coaxially connected to each other so as to integrally rotate.

In the embodiment, although the rotary shaft 54 is integrally formed with the first small diameter gear 45, embodiments disclosed herein are not limited thereto, and it may be configured with a separate member if the rotary shaft 54 and the first small diameter gear 45 are coaxially connected to each other so as to integrally rotate.

In the embodiment, although the outer ring 52 is provided on the second worm wheel 44 and the inner ring 56 is provided on the first small diameter gear 45, the inner ring may be provided on the second worm wheel 44 and the outer ring may be provided on the first small diameter gear 45.

In the embodiment, although the torque limiter 50 is provided between the second worm wheel 44 and the first small diameter gear 45, the torque limiter 50 may be provided between the first large diameter gear 46 and the second small diameter gear 47, and the torque limiter 50 may be provided between the output gear 48 and the output shaft 34. In the former case, an outer ring is provided on one of the first large diameter gear 46 and the second small diameter gear 47, and an inner ring is provided on the other of the first large diameter gear 46 and the second small diameter gear 47, so that a coil spring may be mounted between the outer ring and the inner ring. In addition, in the latter case, an outer ring is provided on one of the output gear 48 and the output shaft 34, and an inner ring is provided on the other of the output gear 48 and the output shaft 34, so that a coil spring may be mounted between the outer ring and the inner ring. As described above, the torque limiter 50 may be disposed at any position as long as a gear of a spur tooth is interposed between the torque limiter 50 and the output shaft 34 or the torque limiter 50 is disposed directly on the output shaft 34.

In the embodiment, although this disclosure is applied to the electric opening and closing device 20 for opening and closing the toilet seat 14, it may be applied to the toilet lid opening and closing device 21 which opens and closes the toilet lid 16.

The correspondence relation between the main elements of the embodiment and the main elements disclosed here described in the section of Summary will be described. In the embodiment, the motor 32 corresponds to "motor", the second worm wheel 44 corresponds to "first gear member", the first small diameter gear 45 corresponds to "second gear member", the reduction gear mechanism 40 corresponds to a "reduction gear mechanism", the outer ring 52 corresponds to a "first rotating member", the rotary shaft 54 and the inner ring 56 correspond to the "second rotating member", the coil spring 58 corresponds to "friction member", and the torque limiter 50 corresponds to "torque limiter". In addition, the coil spring 58 corresponds to "coil spring", the rotary shaft 54 corresponds to "shaft member", and the inner ring 56 corresponds to "cylindrical member". In addition, the second worm 43 corresponds to "worm" and the second worm wheel 44 corresponds to "worm wheel".

Since the embodiment is an example for specifically describing the aspect for performing this disclosure described in the section of the Summary in the embodiment, the correspondence relation between the main elements of the embodiment and the main elements disclosed here described in the section of the Summary does not limit elements disclosed here described in the section of the Summary. That is, the interpretation this disclosure described in the section of the Summary should be made based on the description in the section, and the embodiment is merely a specific example disclosed here described in the section of the Summary.

Hereinbefore, although the aspects for performing this disclosure have been described with reference to the embodiments, this disclosure is not limited to these embodiments at all, and it goes without saying that this disclosure can be implemented in various aspects without departing from the gist disclosed here.

A gist of an electric opening and closing device according to an aspect of this disclosure resides in that the electric opening and closing device opens and closes a toilet seat or a toilet lid by a torque output to an output member, and the device includes a motor, a reduction gear mechanism that has a plurality of gear members including at least a gear member of a spur tooth and transmits the torque of the motor to the output member, and a torque limiter that includes a first rotating member which rotates integrally with a first gear member rotating by the torque of the motor among the plurality of gear members, a second rotating member which rotates integrally with a second gear member connected to the output member via the gear member of the spur tooth among the plurality of gear members or the output member, and a friction member which is engaged with one rotating member of the first rotating member and the second rotating member, and is in frictional contact with the other rotating member, and that generates a slip between the friction member and the other rotating member to interrupt the transmission of the torque when a torque exceeding a specified value acts on the output member.

In the aspect of this disclosure, the electric opening and closing device includes the motor, the reduction gear mechanism, and the torque limiter, as the reduction gear mechanism, the plurality of gear members including at least the gear member of the spur tooth are provided, and as the torque limiter, the first rotating member which rotates integrally with the first gear member rotating by the torque of the motor among the plurality of gear members, the second rotating member which rotates integrally with the second gear member or the output member connected to the output member via the gear member of the spur tooth, and the friction member which is engaged with one rotating member of the first rotating member and the second rotating member, and is in frictional contact with the other rotating member are provided. Since the variation in torque transmission efficiency (individual difference) of the gear of the spur tooth is smaller than that of the gear such as the worm, by disposing the torque limiter between the first gear member rotating by the torque of the motor and the second gear member connected to the output member via the gear member of the spur tooth, it is easy to manage the torque (slip torque) that causes slip between the friction member and the other rotating member by the external force from the output member. Alternatively, by disposing the torque limiter between the output member and the first gear member rotating by the torque of the motor, it is easy to manage the slip torque in the same manner. In addition, since the torque limiter is configured by engaging the friction member with the first rotating member and causing the friction member to be in frictional contact with the second rotating member, the configuration can be simplified.

In the electric opening and closing device according to the aspect of this disclosure, the other rotating member may include a shaft member extending in an axial direction and a metal cylindrical member fixed to an outer circumference of the shaft member, and the friction member may be a metal coil spring of which an inner circumference is in frictional contact with an outer circumference of the cylindrical member. In this manner, abrasion between the cylindrical member and the coil spring is reduced, and it is possible to suppress a decrease in frictional force due to aging.

In the electric opening and closing device according to the aspect of this disclosure, the reduction gear mechanism may include a worm rotating by the torque of the motor, and a worm wheel meshing with the worm, and the first gear member may be the worm wheel. In this manner, the rotation of the motor is sufficiently reduced by the worm and the worm wheel and transmitted to the output member while the worm is not disposed between the torque limiter and the output member so that the slip torque can be easily managed.

In the electric opening and closing device according to the aspect of this disclosure, the first rotating member may be integrally formed with the first gear member. In this manner, the number of parts can be reduced and the configuration can be further simplified.

In the electric opening and closing device according to the aspect of this disclosure, the second rotating member may be integrally formed with the second gear member. In this manner, the number of parts can be reduced and the configuration can be further simplified.

This disclosure can be used in the manufacturing industry of the electric opening and closing device and the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric opening and closing device that opens and closes a toilet seat or a toilet lid by a torque output to an output member, the device comprising:
    a motor;
    a reduction gear mechanism that has a plurality of gear members including at least a gear member of a spur tooth and transmits the torque of the motor to the output member; and
    a torque limiter that includes
        a first rotating member which rotates integrally with a first gear member rotating by the torque of the motor among the plurality of gear members,
        a second rotating member which rotates integrally with a second gear member connected to the output member via the gear member of the spur tooth among the plurality of gear members or the output member, and
        a friction member which is engaged with one rotating member of the first rotating member and the second rotating member, and is in frictional contact with the other rotating member of the first rotating member and the second rotating member,
    wherein the torque limiter generates a slip between the friction member and the other rotating member to interrupt the transmission of the torque when a torque exceeding a specified value acts on the output member, wherein the other rotating member includes a shaft member extending in an axial direction and a metal cylindrical member fixed to an outer circumference of the shaft member, wherein the friction member is a metal coil spring of which an inner circumference is in frictional contact with an outer circumference of the cylindrical member, and wherein the cylindrical member includes a flat outer circumferential surface which is in frictional contact with the inner circumference of the metal coil spring.

2. The electric opening and closing device according to claim 1, wherein the reduction gear mechanism includes a worm rotating by the torque of the motor, and a worm wheel meshing with the worm, and the first gear member is the worm wheel.

3. The electric opening and closing device according to claim 1, wherein the first rotating member is integrally formed with the first gear member.

4. The electric opening and closing device according to claim 1, wherein the second rotating member is integrally formed with the second gear member.

5. The electric opening and closing device according to claim 1, wherein the other rotating member is the second rotating member, and includes a flange axially disposed between the second gear member and the cylindrical member.

* * * * *